(12) United States Patent
Shao et al.

(10) Patent No.: US 9,330,292 B2
(45) Date of Patent: May 3, 2016

(54) TWO-DIMENSIONAL CODE SCANNING METHOD AND DEVICE

(71) Applicant: Tencent Technology (Shenzhen) Company Limited, Shenzhen (CN)

(72) Inventors: Heming Shao, Shenzhen (CN); Muwen Yang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/465,183

(22) Filed: Aug. 21, 2014

(65) Prior Publication Data

US 2014/0361083 A1    Dec. 11, 2014

Related U.S. Application Data

(63) Continuation of application No. PCT/CN2013/089757, filed on Dec. 18, 2013.

(30) Foreign Application Priority Data

Apr. 28, 2013    (CN) .......................... 2013 1 0157849

(51) Int. Cl.
  *G06K 7/14*    (2006.01)
(52) U.S. Cl.
  CPC ............ *G06K 7/1439* (2013.01); *G06K 7/1443* (2013.01); *G06K 7/1417* (2013.01)

(58) Field of Classification Search
  USPC ...................................... 235/462.11
  See application file for complete search history.

(56) References Cited

U.S. PATENT DOCUMENTS

| | | | |
|---|---|---|---|
| 8,226,006 B2 * | 7/2012 | Kuromatsu et al. ...... | 235/462.11 |
| 2010/0038427 A1 * | 2/2010 | Kuromatsu et al. ...... | 235/462.11 |
| 2014/0123018 A1 * | 5/2014 | Park .............................. | 715/738 |
| 2014/0218611 A1 * | 8/2014 | Park et al. ..................... | 348/565 |

FOREIGN PATENT DOCUMENTS

| | | |
|---|---|---|
| CN | 102609544 A | 7/2012 |
| CN | 102880849 A | 1/2013 |
| CN | 103218595 A | 7/2013 |
| JP | 2003244285 A | 8/2003 |

\* cited by examiner

*Primary Examiner* — Christle I Marshall
(74) *Attorney, Agent, or Firm* — The Webb Law Firm

(57) ABSTRACT

A two-dimensional code scanning method and device is provided, the method including: displaying a scanning window; obtaining a window adjustment instruction, and moving and/or scaling the scanning window based on the window adjustment instruction; obtaining coordinate information of the scanning window; creating a target image according to the coordinate information; recognizing the target image, and extracting data information corresponding to the target image. By the method and device, the hardware costs are reduced.

15 Claims, 7 Drawing Sheets

TWO-DIMENSIONAL CODE SCANNING METHOD AND DEVICE

CROSS-REFERENCE TO RELATED APPLICATION

This application is a continuation of PCT/CN2013/089757 filed Dec. 18, 2013, which designates inter alia the United States and claims priority to Chinese Patent Application No. 201310157849.5 filed Apr. 28, 2013, the disclosures of which are hereby incorporated in their entirety by reference.

FIELD OF THE INVENTION

The present disclosure relates generally to the field of computer technology, and more particularly to a two dimensional-code scanning method and device.

BACKGROUND OF THE INVENTION

A two-dimensional code, also known as a two-dimensional barcode, is a specific black and white pattern distributed according to certain rules in a plane (two-dimensional direction), which is used to record information of data and symbol, as a key to the information. Data information contained in a two-dimensional code can be extracted by image recognition. The two-dimensional code can be widely used in various fields, including product security/trace, advertise pushing, website link, data downloading, commodity trading, positioning/navigation, electronic documents and vehicle management, etc.

Recognition of a two-dimensional code in the prior art is based on the scanning operation of the two-dimensional code recognition device. The known recognition device typically includes a camera for scanning the printed two-dimensional code label. Upon collection of the two-dimensional code, relevant recognition algorithms are implemented to extract data information.

When browsing a webpage with a computer or smart phone, a scanning device, such as an external video camera, has to be used to scan the two-dimensional code image in a webpage. This increases the hardware costs.

SUMMARY OF THE INVENTION

To address the aforementioned deficiencies and inadequacies, there is a need to provide a two-dimensional code scanning method and device which can reduce the hardware costs.

According to one aspect of the disclosure, a two-dimensional code scanning method includes:
displaying a scanning window;
obtaining a window adjustment instruction, and moving and/or scaling the scanning window based on the window adjustment instruction;
obtaining coordinate information of the scanning window;
creating a target image according to the coordinate information;
recognizing the target image, and extracting data information corresponding to the target image.

According to another aspect of the disclosure, a two-dimensional code scanning device includes:
a window display module, configured to display a scanning window;
a window adjustment module, configured to obtain a window adjustment instruction, and to move and/or scale the scanning window based on the window adjustment instruction;
a coordinate obtaining module, configured to obtain the coordinate information of the scanning window;
an image capturing module, configured to create a target image according to the coordinate information;
a recognition module, configured to recognize the target image and extract data information corresponding to the target image.

According to another aspect of the disclosure, a non-transitory computer-readable storage medium comprising an executable program to execute two-dimensional code scanning method, the method including:
displaying a scanning window;
obtaining a window adjustment instruction, and moving and/or scaling the scanning window based on the window adjustment instruction;
obtaining coordinate information of the scanning window;
creating a target image according to the coordinate information; and
recognizing the target image, and extracting data information corresponding to the target image.

By the above two-dimensional code scanning method and device, it is possible to adjust the position and/or size of the displayed scanning window, such that the scanning window can cover the two-dimensional code mage displayed on an interface underneath, e.g. a webpage or document. Thus, a target image corresponding to the covered two-dimensional code mage can be created. By recognition of the target image, corresponding data information can be obtained. In this way, the two-dimensional code image displayed on the terminal device can be recognized by the terminal device itself instead of an external camera, which can reduce the hardware costs.

DETAILED DESCRIPTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
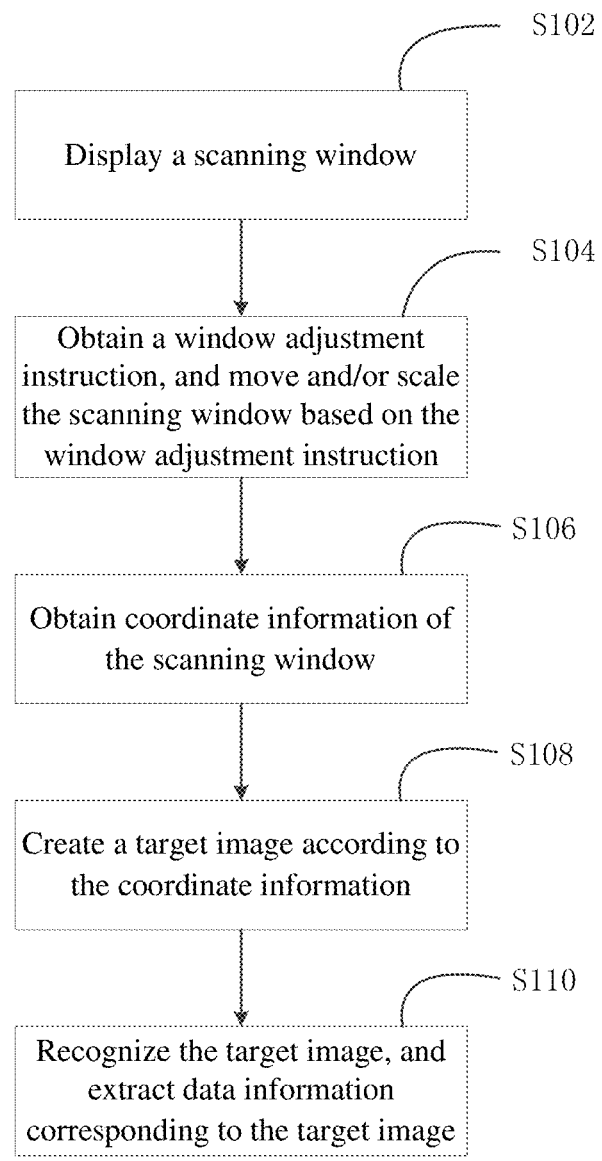
FIG. 1 is a flowchart illustrating a two-dimensional code scanning method in accordance with an aspect of the disclosure.

As illustrated in FIG. 1, a two-dimensional code scanning method includes the following steps.

Step S102, displaying a scanning window.

Figure 2:
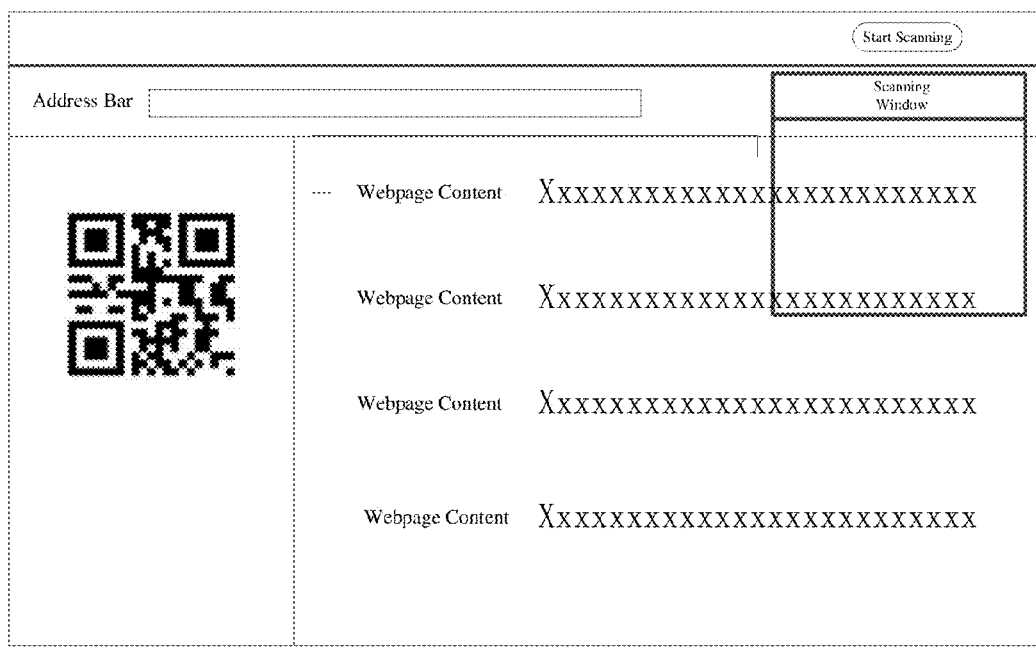
FIG. 2 is a diagram illustrating an interface of the scanning window of an application scene in accordance with an aspect of the disclosure.

In one embodiment, as illustrated in FIG. 2, a scanning window, as the window floating at the top of the display interface, has borders and transparent window content. That is, a scanning window will not block the display interface underneath, nor will have blocking effect to the operation of the applications underneath.

For example, in an application scene, the method can run based on a browser plug-in. As illustrated in FIG. 2, the user can click a plug-in button on the browser to pop up a scanning window with transparent window content. The scanning window has borders that clearly indicate the defined screen position. In addition, the scanning window will not cause any blocking effect to the browser, and the user can operate normally to surf the web in accordance with his/her habit.

In another application scene, the method can run based on an application having an independent process. When browsing a document, the user can run the application to pop up a scanning window; the borders of the scanning window clearly indicate the region in the document defined by the user.

Step S104, obtaining a window adjustment instruction, and moving and/or scaling the scanning window according to the window adjustment instruction.

A window adjustment instruction is an instruction inputted for adjusting the position, shape or size of the scanning window.

Figure 3:
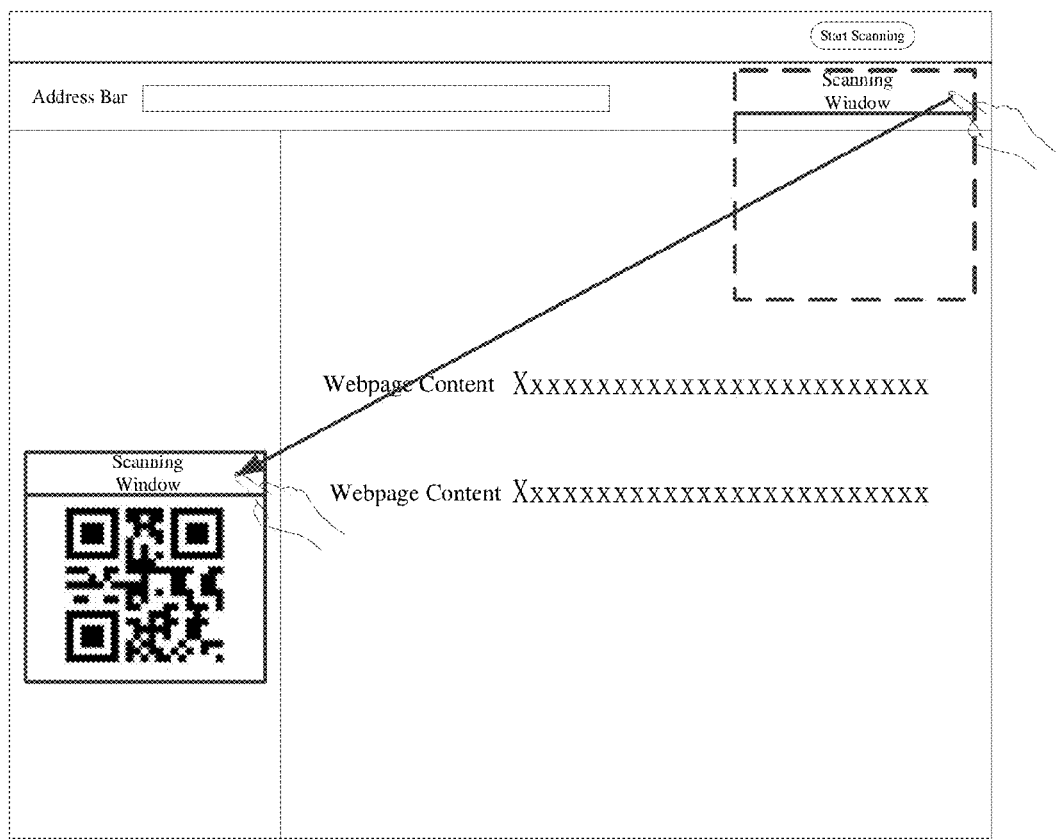
FIG. 3 is a diagram illustrating the operation of moving the scanning window of an application scene in accordance with an aspect of the disclosure.

In an application scene, the method can run on a terminal device which has a touch screen. As illustrated in FIG. 3, the user can long press the scanning window and slide to input a window adjustment instruction for adjusting the position of the window, or knead or stretch fingers on the touch screen to input the window adjustment instruction for adjusting the shape or size of the window.

Figure 4:
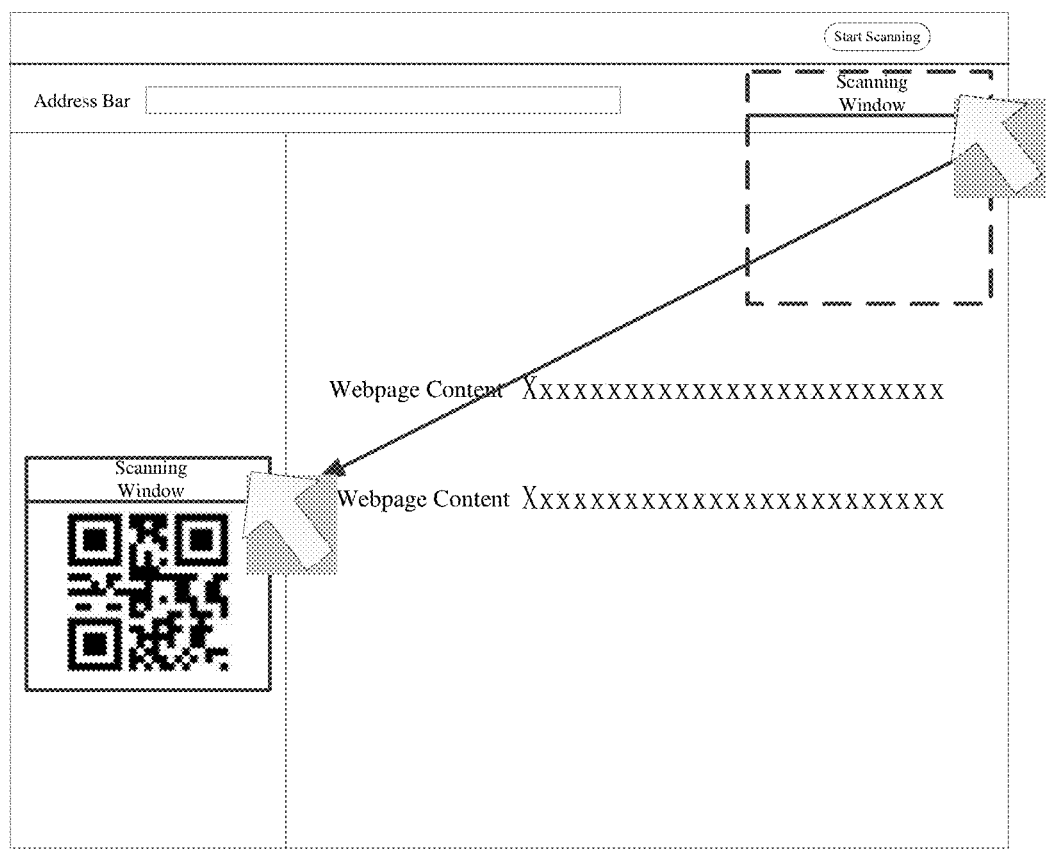
FIG. 4 is a diagram illustrating the operation of moving the scanning window of another application scene in accordance with an aspect of the disclosure.

In another application scene, the method can run on a terminal device having a mouse. As illustrated in FIG. 4, the user can move the scanning window by sliding the mouse, and adjust the size of the scanning window by adjusting the borders of the scanning window. In the application scene illustrated in FIG. 5, the user can also perform the box selection operation, move the scanning window to a position corresponding to the box selection operation, and adjust the size of the scanning window to that of the rectangle box defined by the box selection operation.

Step S106, obtaining coordinate information of the scanning window.

The coordinate information of the scanning window can be represented by the pixel coordinate of the display. Preferably, the scanning window may have a rectangular shape, and the pixel coordinates of the angular points of the scanning window can be obtained. When the scanning window borders have widths, then the pixel coordinates of the angular points of the inner rectangle of the scanning window can be obtained.

Step S108, creating a target image according to the coordinate information.

In one embodiment, a target image can be created by screen capture according to the coordinate information. That is, call the screen capture function of the operating system to capture a screen, capture an image region corresponding to the coordinate information, and create a target image based on the image region. In another embodiment, the image displayed under the scanning window within the region defined by the coordinates can be obtained according to the coordinate information.

In one embodiment, the method may include, before creating a target image by screen capture according to the coordinate information, obtaining a coordinate adjustment timeout threshold, detecting the time length of an unchanged state of the coordinate information, and determining whether the time length is greater than the coordinate adjustment timeout threshold; if yes, then perform the step of creating a target image by screen capture according to the coordinate information.

Figure 5:
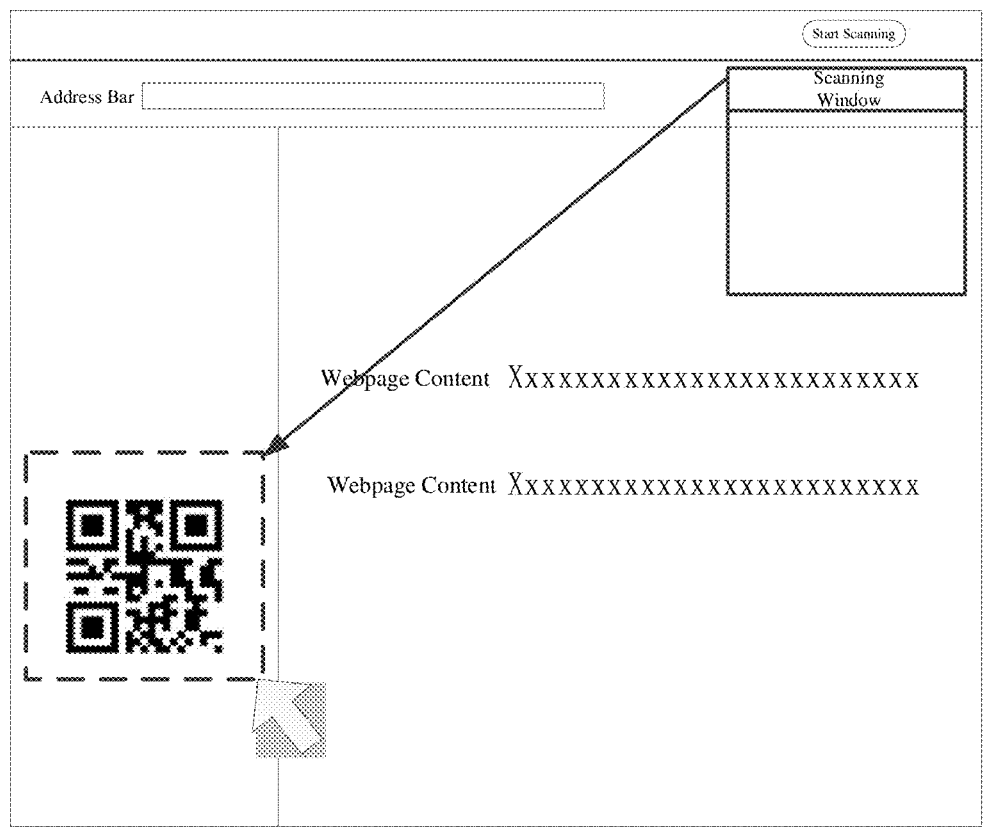
FIG. 5 is a diagram illustrating the operation of moving the scanning window of yet another application scene in accordance with an aspect of the disclosure.

In an application scene, as illustrated in FIG. 5, a two-dimensional code image is displayed in a webpage. The user can continuously adjust the position, shape or size of the scanning window by constantly inputting window adjustment instructions, so as move the scanning window to completely cover the two-dimensional code image in the webpage. Then, the user can wait for a while, until the coordinate information of the scanning window no longer changes (during the adjusting process, the coordinate information of the scanning window changes according to the window adjustment instructions). The time length counted from the moment when the coordinate information no longer changes can be recorded; if the time length is greater than the coordinate adjustment timeout threshold, then a target image is created according to the coordinate information. In other words, when the user determines that the two-dimensional code image is covered by the scanning window, if only he/she no longer adjusts the position, shape or size of the scanning window, and waits for a sufficient time length, then the operation of creating a target image according to the coordinate information can be triggered.

In another embodiment, the operation of creating a target image according to the coordinate information may also be triggered by a function button. For example, after adjusting the position, shape and size of the scanning window and determining that the scanning window has covered the two-dimensional code image, the user can click relevant button or icon to trigger the operation of creating a target image according to the coordinate information.

Step S110, recognizing the target image, and extracting data information corresponding to the target image.

Relevant two-dimensional code recognition algorithms can be used to recognize the target image, and to extract corresponding data information.

In one embodiment, the scanning window may further include a recognition result displaying region. If the recognition fails, the error code can be displayed in the region, and if the recognition is successful, then the data information can also be displayed in the region.

Figure 6:
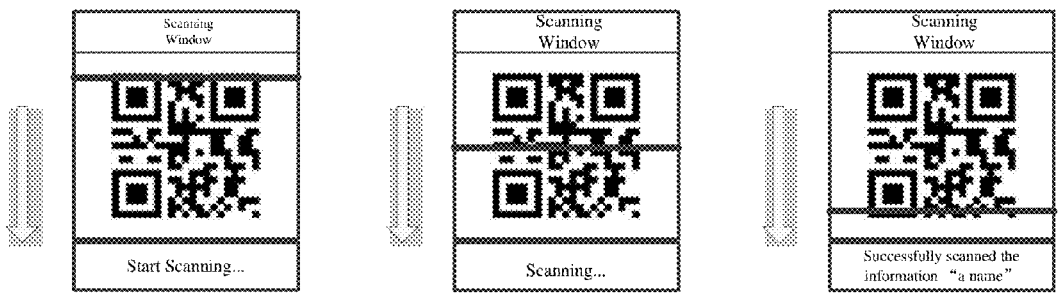
FIG. 6 is a diagram illustrating the moving of the scan line in the scanning window of an application scene in accordance with an aspect of the disclosure.

In one embodiment, as illustrated in FIG. 6, a scan line and the translational animation thereof can be displayed in the scanning window during scanning of a target image. Preferably, the translational amount of the scan line is in accordance with the recognition process to the target image.

For example, the scan line can be a red horizontal line to simulate the visual effects of laser in reality emitted by a scanning device. The translational animation may move in a uniform speed, or, the translational amount or translational speed of the scan line may be determined by the recognition process to the target image.

Since the amount of computation of image recognition is large, it may usually take some time to feedback the recognition result. Therefore, by displaying the translational animation of the scan line during image recognition, it is possible to inform the user whether the scanning process has started or ended, thereby improving the user experience.

In one embodiment, the method may include, after extracting data information corresponding to the target image, determining whether the extracted data information is a link; if yes, then access the link.

In one embodiment, when it is a web link, then automatically access the webpage of the link by the currently running browser. In other embodiments, it may firstly start the browser, and then access the webpage of the link by the web browser.

When the link is a resource file link, then the resource file corresponding to the resource file link can be obtained and opened by calling the appropriate application. For example, when the link points to a picture, the picture may be opened by calling the picture view application, and when the link points to an mp3 audio file, then call the audio player to play the mp3 audio.

In one embodiment, the method may include, after extracting the data information corresponding to the target image, obtaining a focus object and/or a cursor position, and determining whether the focus object and/or the cursor position corresponds to an input box; if yes, then add the data information into the input box.

For example, in an application scene in accordance with the present embodiment, when the user determines that the data information contained in the two-dimensional code image should be of the contact address type, the user can position the cursor in an input box in a webpage corresponding to the contact address, and then extract, following the above procedure, the data information (typically a string) contained in the two-dimensional code image in the webpage. The data information can then be automatically added to the cursor position in the input box corresponding to the contact address.

In one embodiment, the method may include, before obtaining the window adjustment instruction, obtaining and displaying in the scanning window, an external image captured by the camera, and detecting whether any window adjustment instructions are inputted; and if yes, then set the scanning window to a transparent state, and implement the step of obtaining window adjustment instruction.

It should be noted that the transparent state refers to a state with the inside window content being transparent, while the borders of the window still exist.

In one embodiment, when no input of window adjustment instruction is detected, then an inputted scan-start instruction is obtained. A target image is created according to the scan-start instruction and the external image. Further, the step of recognizing the target image and extracting data image corresponding to the target image is implemented.

In an application scene in accordance with the present embodiment, the method relies on a terminal device having a camera. The user can click a button of the browser to display the scanning window. The scanning window displayed can be located at the edge of the display interface and attached to the toolbar. If the user does not make any adjustments to the position, shape or size of the scanning window, then the external image captured by the camera, i.e., the image obtained using the video function of the camera (typically a plurality of images), will be displayed in the scanning window. The user can click the button to input a scan-start instruction, so as to freeze the external image captured by the camera to obtain a target image (i.e., the external image captured by a smart phone upon receiving the scan-start instruction). Then, the target image can be recognized to obtain data information by the terminal device using the above method.

For example, with reference to the application scene described above, the user can obtain data information of the type of web link, and automatically access the webpage by recognizing the external image captured by the camera (including the region of the two-dimensional code image). The user may also position the cursor in the input box, which can then be automatically filled in with data information obtained by recognition of the external image captured by the camera.

In one application scene, if the user makes adjustments to the position, shape or size of the scanning window during the displaying of the external image captured by the camera in the scanning window, the scanning window may no longer display the external image, but set to transparent state. The user can then move the scanning window to a position corresponding to the two-dimensional code image in a webpage or document, and obtain the corresponding data information by recognition.

Firstly, display an external image through the scanning window, and then determine whether any window adjustment instruction is inputted; based on the above, determine whether to recognize the two-dimensional code image captured by the camera or that in a webpage or document on the display interface. By this way, the user can easily switch between the two modes, thereby increasing the versatility.

Further, in this embodiment, an angle switching instruction may be received, and the window contents displayed can be switched according to the angle switching instruction, i.e., switching between the transparent state and the state displaying an external image. This facilitates the user to freely select the mode for scanning a two-dimensional code.

Figure 7:
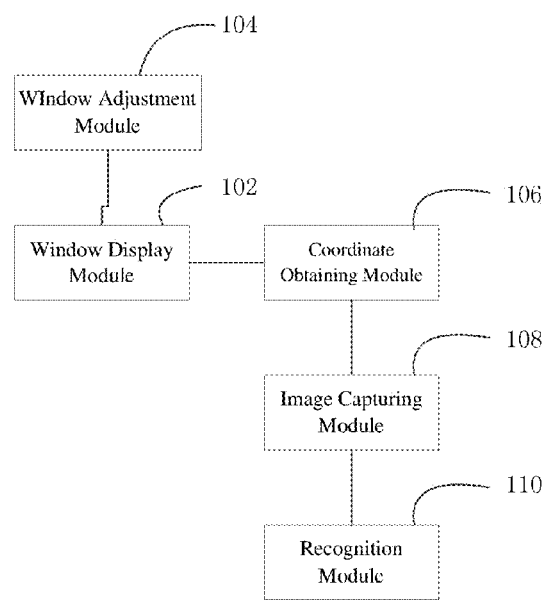
FIG. 7 is a structural schematic diagram illustrating a two-dimensional code scanning method in accordance with an aspect of the disclosure.

In one embodiment, as illustrated in FIG. 7, a two-dimensional code scanning device includes a window display module 102, a window adjustment module 104, a coordinate obtaining module 106, an image capturing module 108 and a recognition module 110.

The window display module 102 is configured to display a scanning window.

In one embodiment, as illustrated in FIG. 2, a scanning window, as the window floating at the top of the display interface, has borders and transparent window content. That is, a scanning window will not block the display interface underneath, nor will have blocking effect to the operation of the applications underneath.

For example, in an application scene, the two-dimensional code scanning device can run based on a browser plug-in. As illustrated in FIG. 2, the user can click a plug-in button on the browser to pop up a scanning window with transparent window content. The scanning window has borders that clearly indicate the defined screen position. In addition, the scanning window will not cause any blocking effect to the browser, and the user can operate normally to surf the web in accordance with his/her habit.

In another application scene, the two-dimensional code scanning device can run based on an application having an independent process. When browsing a document, the user can run the application to pop up a scanning window; the borders of the scanning window clearly indicate the region in the document defined by the user.

The window adjustment module 104 is configured to obtain a window adjustment instruction, and to move and/or scale the scanning window based on the window adjustment instruction.

A window adjustment instruction is an instruction inputted for adjusting the position, shape or size of the scanning window.

In an application scene, the two-dimensional code scanning device can be based on a terminal device which has a touch screen. As illustrated in FIG. 3, the user can long press the scanning window and slide to input a window adjustment instruction for adjusting the position of the window, or knead or stretch fingers on the touch screen to input the window adjustment instruction for adjusting the shape or size of the window.

In another application scene, the two-dimensional code scanning device can be based on a terminal device having a mouse. As illustrated in FIG. 4, the user can move the scanning window by sliding the mouse, and adjust the size of the scanning window by adjusting the borders of the scanning window. In the application scene illustrated in FIG. 5, the user can also perform the box selection operation, move the scanning window to a position corresponding to the box selection operation, and adjust the size of the scanning window to that of the rectangle box defined by the box selection operation.

The coordinate obtaining module 106 is configured to obtain the coordinate information of the scanning window.

The coordinate information of the scanning window can be represented by the pixel coordinate of the display. Preferably, the scanning window may have a rectangular shape, and the pixel coordinates of the angular points of the scanning window can be obtained. When the scanning window borders have widths, then the pixel coordinates of the angular points of the inner rectangle of the scanning window can be obtained.

The image capturing module 108 is configured to create a target image according to the coordinate information.

In one embodiment, the image capturing module 108 may be configured to create a target image by screen capture according to the coordinate information. That is, call the screen capture function of the operating system to capture a screen, capture an image region corresponding to the coordinate information, and create a target image based on the image region. In another embodiment, the image capturing module 108 may further obtain the image displayed under the scanning window within the region defined by the coordinates according to the coordinate information.

Figure 8:
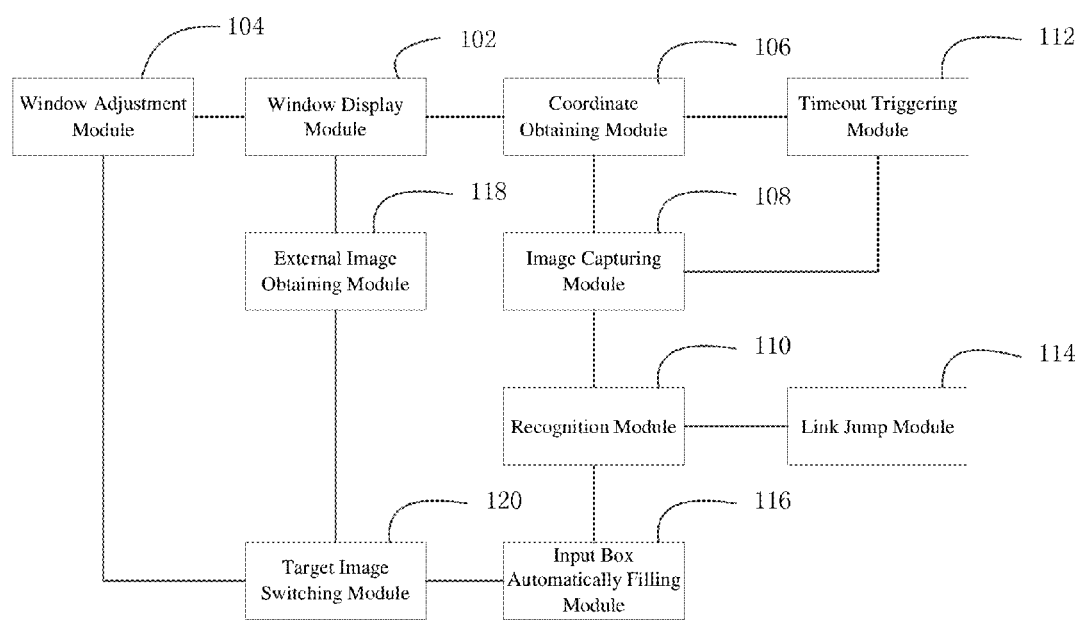
FIG. 8 is a structural schematic diagram illustrating a two-dimensional code scanning device in accordance with an aspect of the disclosure.

In one embodiment, as illustrated in FIG. 8, the two-dimensional code scanning device may include a timeout triggering module 112 configured to obtain a coordinate adjustment timeout threshold, detect the time length of an unchanged state of the coordinate information, and determine whether the time length is greater than the coordinate adjustment timeout threshold; if yes, then call the image capturing module 108.

In an application scene, as illustrated in FIG. 5, a two-dimensional code image is displayed in a webpage. The user can continuously adjust the position, shape or size of the scanning window by constantly inputting window adjustment instructions, so as move the scanning window to completely cover the two-dimensional code image in the webpage. Then, the user can wait for a while, until the coordinate information of the scanning window no longer changes (during the adjusting process, the coordinate information of the scanning window changes according to the window adjustment instructions). The time length counted from the moment when the coordinate information no longer changes can be recorded; if the time length is greater than the coordinate adjustment timeout threshold, then a target image is created according to the coordinate information. In other words, when the user determines that the two-dimensional code image is covered by the scanning window, if only he/she no longer adjusts the position, shape or size of the scanning window, and waits for a sufficient time length, then the operation of creating a target image according to the coordinate information can be triggered.

In another embodiment, the image capturing module 108 may be triggered by a function button. For example, after adjusting the position, shape and size of the scanning window and determining that the scanning window has covered the two-dimensional code image, the user can click relevant button or icon to trigger the operation of creating a target image according to the coordinate information.

The recognition module 110 is configured to recognize the target image and extract data information corresponding to the target image.

The recognition module 110 may be configured to recognize the target image by relevant two-dimensional code recognition algorithms, and to extract corresponding data information.

In one embodiment, the scanning window may further include a recognition result displaying region. If the recognition fails, the error code can be displayed in the region by the recognition module 110, and if the recognition is successful, then the data information can be displayed in the region.

In one embodiment, as illustrated in FIG. 6, a scan line and the translational animation thereof can be displayed in the scanning window during scanning of a target image. Preferably, the translational amount of the scan line is in accordance with the recognition process to the target image.

For example, the scan line can be a red horizontal line to simulate the visual effects of laser in reality emitted by a scanning device. The translational animation may move in a uniform speed, or, the translational amount or translational speed of the scan line may be determined by the recognition process to the target image.

Since the amount of computation of image recognition is large, it may usually take some time to feedback the recognition result. Therefore, by displaying the translational animation of the scan line during image recognition, it is possible to inform the user whether the scanning process has started or ended, thereby improving the user experience.

In one embodiment, as illustrated in FIG. 8, the two-dimensional code scanning device may include a link jump module 114, which is configured to determine whether the extracted data information is a link; if yes, then access the link.

In one embodiment, when it is a web link, then automatically access the webpage of the link by the currently running browser. In other embodiments, it may firstly start the browser, and then access the webpage of the link by the web browser.

When the link is a resource file link, then the resource file corresponding to the resource file link can be obtained and opened by calling the appropriate application. For example, when the link points to a picture, the picture may be opened by calling the picture view application, and when the link points to an mp3 audio file, then call the audio player to play the mp3 audio.

In one embodiment, as illustrated in FIG. 8, the two-dimensional code scanning device may include an input box automatically filling module 116, which is configured to obtain a focus object and/or the cursor position, and determine whether the focus object and/or the cursor position corresponds to an input box; if yes, then add the data information into the input box.

For example, in an application scene in accordance with the present embodiment, when the user determines that the data information contained in the two-dimensional code image should be of the contact address type, the user can position the cursor in an input box in a webpage corresponding to the contact address, and then extract, following the above procedure, the data information (typically a string)

contained in the two-dimensional code image in the webpage. The data information can then be automatically added to the cursor position in the input box corresponding to the contact address.

In one embodiment, as illustrated in FIG. 8, the two-dimensional code scanning device may include an external image obtaining module 118, which is configured to obtain and display in the scanning window, an external image captured by the camera.

In one embodiment, as illustrated in FIG. 8, the two-dimensional code scanning device may further include an target image switching module 120, which is configured to detect whether any window adjustment instructions are inputted; and if yes, then set the scanning window to a transparent state, and call the window adjustment module 104.

It should be noted that the transparent state refers to a state with the inside window content being transparent, while the borders of the window still exist.

In one embodiment, the target image switching module 120 is further configured to, when no input of window adjustment instruction is detected, obtain an inputted scan-start instruction, create a target image according to the scan-start instruction and the external image, and call the recognition module 110.

In an application scene in accordance with the present embodiment, the two-dimensional code scanning device is based on a terminal device having a camera. The user can click a button of the browser to display the scanning window. The scanning window displayed can be located at the edge of the display interface and attached to the toolbar. If the user does not make any adjustments to the position, shape or size of the scanning window, then the external image captured by the camera, i.e., the image obtained using the video function of the camera (typically a plurality of images), will be displayed in the scanning window. The user can click the button to input a scan-start instruction, so as to freeze the external image captured by the camera to obtain a target image (i.e., the external image captured by a smart phone upon receiving the scan-start instruction). Then, the target image can be recognized to obtain data information by the terminal device using the above method.

For example, with reference to the application scene described above, the user can obtain data information of the type of web link, and automatically access the webpage by recognizing the external image captured by the camera (including the region of the two-dimensional code image). The user may also position the cursor in the input box, which can then be automatically filled in with data information obtained by recognition of the external image captured by the camera.

In one application scene, if the user makes adjustments to the position, shape or size of the scanning window during the displaying of the external image captured by the camera in the scanning window, the scanning window may no longer display the external image, but set to transparent state. The user can then move the scanning window to a position corresponding to the two-dimensional code image in a webpage or document, and obtain the corresponding data information by recognition.

Firstly, display an external image through the scanning window, and then determine whether any window adjustment instruction is inputted; based on the above, determine whether to recognize the two-dimensional code image captured by the camera or that in a webpage or document on the display interface. By this way, the user can easily switch between the two modes, thereby increasing the versatility.

Further, in this embodiment, the target image switching module 120 is further configured to receive an angle switching instruction, and switching the displayed window contents according to the angle switching instruction, i.e., switching between the transparent state and the state displaying an external image. This facilitates the user to freely select the mode for scanning a two-dimensional code.

By the above two-dimensional code scanning method and device, it is possible to adjust the position and/or size of the displayed scanning window, such that the scanning window can cover the two-dimensional code mage displayed on an interface underneath, e.g. a webpage or document. Thus, a target image corresponding to the covered two-dimensional code mage can be created. By recognition of the target image, corresponding data information can be obtained. In this way, the two-dimensional code image displayed on the terminal device can be recognized by the terminal device itself instead of an external camera, which can reduce the hardware costs.

It should be noted that for a person skilled in the art, partial or full process to realize the methods in the above embodiments can be accomplished by related hardware instructed by a computer program, the program can be stored in a computer readable storage medium and the program can include the process of the embodiments of the above methods. Wherein, the storage medium can be a disk, a light disk, a Read-Only Memory or a Random Access Memory, etc.

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A two-dimensional code scanning method, comprising:
   displaying a scanning window floating on a display interface;
   obtaining a window adjustment instruction, and moving and/or scaling the scanning window based on the window adjustment instruction;
   obtaining coordinate information of the scanning window;
   obtaining a coordinate adjustment timeout threshold;
   detecting a time length of an unchanged state of the coordinate information, and determining whether the time length is greater than the coordinate adjustment timeout threshold;
   if the time length is greater than the coordinate adjustment timeout threshold, creating a target image from the display interface according to the coordinate information; and
   recognizing the target image, and extracting data information corresponding to the target image.

2. The method of claim 1, further comprising, after extracting data information:
   determining whether the extracted data information is a link; if yes, then access the link.

3. The method of claim 1, further comprising, after extracting the data information:
   obtaining a focus object and/or a cursor position, and
   determining whether the focus object and/or the cursor position corresponds to an input box; if yes, then add the data information into the input box.

4. The method of claim 1, further comprising, before obtaining the window adjustment instruction:

obtaining and displaying, in the scanning window, an external image captured by a camera; and detecting whether any window adjustment instructions are inputted; and if yes, then set the scanning window to a transparent state, and implement the step of obtaining window adjustment instruction.

5. The method of claim 4, further comprising, after determining whether any window adjustment instructions are inputted:

obtaining an inputted scan-start instruction in case no input of window adjustment instruction is detected;

creating a target image according to the inputted scan-start instruction and the external image; and recognizing the target image, and extracting data image corresponding to the target image.

6. A two-dimensional code scanning device, comprising:

a window display module, configured to display a scanning window floating on a display interface;

a window adjustment module, configured to obtain a window adjustment instruction, and to move and/or scale the scanning window based on the window adjustment instruction;

a coordinate obtaining module, configured to obtain coordinate information of the scanning window;

an image capturing module, configured to create a target image from the display interface according to the coordinate information;

a recognition module, configured to recognize the target image and extract data information corresponding to the target image; and a timeout triggering module, configured to obtain a coordinate adjustment timeout threshold, detect a time length of an unchanged state of the coordinate information, and determine whether the time length is greater than the coordinate adjustment timeout threshold; if yes, then call the image capturing module.

7. The device of claim 6, further comprising a link jump module configured to determine whether the extracted data information is a link; if yes, then access the link.

8. The device of claim 6, further comprising an input box automatically filling module, configured to obtain a focus object and/or a cursor position, and determine whether the focus object and/or the cursor position corresponds to an input box; if yes, then add the data information into the input box.

9. The device of claim 6, further comprising an external image obtaining module configured to obtain and display, in the scanning window, an external image captured by a camera; wherein the device further comprises a target image switching module configured to detect whether any window adjustment instructions are inputted; and if yes, then set the scanning window to a transparent state, and call a window adjustment module.

10. The device of claim 9, wherein the target image switching module is configured to, when no input of window adjustment instruction is detected, obtain an inputted scan-start instruction, create a target image according to the scan-start instruction and the external image, and call a recognition module.

11. A non-transitory computer-readable storage medium comprising an executable program to execute a two-dimensional code scanning method, the method comprising:

displaying a scanning window floating on a display interface;

obtaining a window adjustment instruction, and moving and/or scaling the scanning window based on the window adjustment instruction;

obtaining coordinate information of the scanning window;

obtaining a coordinate adjustment timeout threshold;

detecting a time length of an unchanged state of the coordinate information, and determining whether the time length is greater than the coordinate adjustment timeout threshold;

if the time length is greater than the coordinate adjustment timeout threshold, creating a target image from the display interface according to the coordinate information; and recognizing the target image, and extracting data information corresponding to the target image.

12. The non-transitory computer-readable storage medium of claim 11, wherein the method further comprises, after extracting data information:

determining whether the extracted data information is a link; if yes, then access the link.

13. The non-transitory computer-readable storage medium of claim 11, wherein the method further comprises, after extracting the data information:

obtaining a focus object and/or a cursor position; and determining whether the focus object and/or the cursor position corresponds to an input box; if yes, then add the data information into the input box.

14. The non-transitory computer-readable storage medium of claim 11, wherein the method further comprises, before obtaining the window adjustment instruction:

obtaining and displaying, in the scanning window, an external image captured by a camera; and detecting whether any window adjustment instructions are inputted; and if yes, then set the scanning window to a transparent state, and implement the step of obtaining window adjustment instruction.

15. The non-transitory computer-readable storage medium of claim 14, wherein the method further comprises, after determining whether any window adjustment instructions are inputted:

obtaining an inputted scan-start instruction in case no input of window adjustment instruction is detected;

creating a target image according to the inputted scan-start instruction and the external image; and recognizing the target image and extracting data image corresponding to the target image.

\* \* \* \* \*